Dec. 26, 1961 R. C. HILLIARD 3,015,068
STABLE QUADRATURE CIRCUIT
Filed Aug. 19, 1959
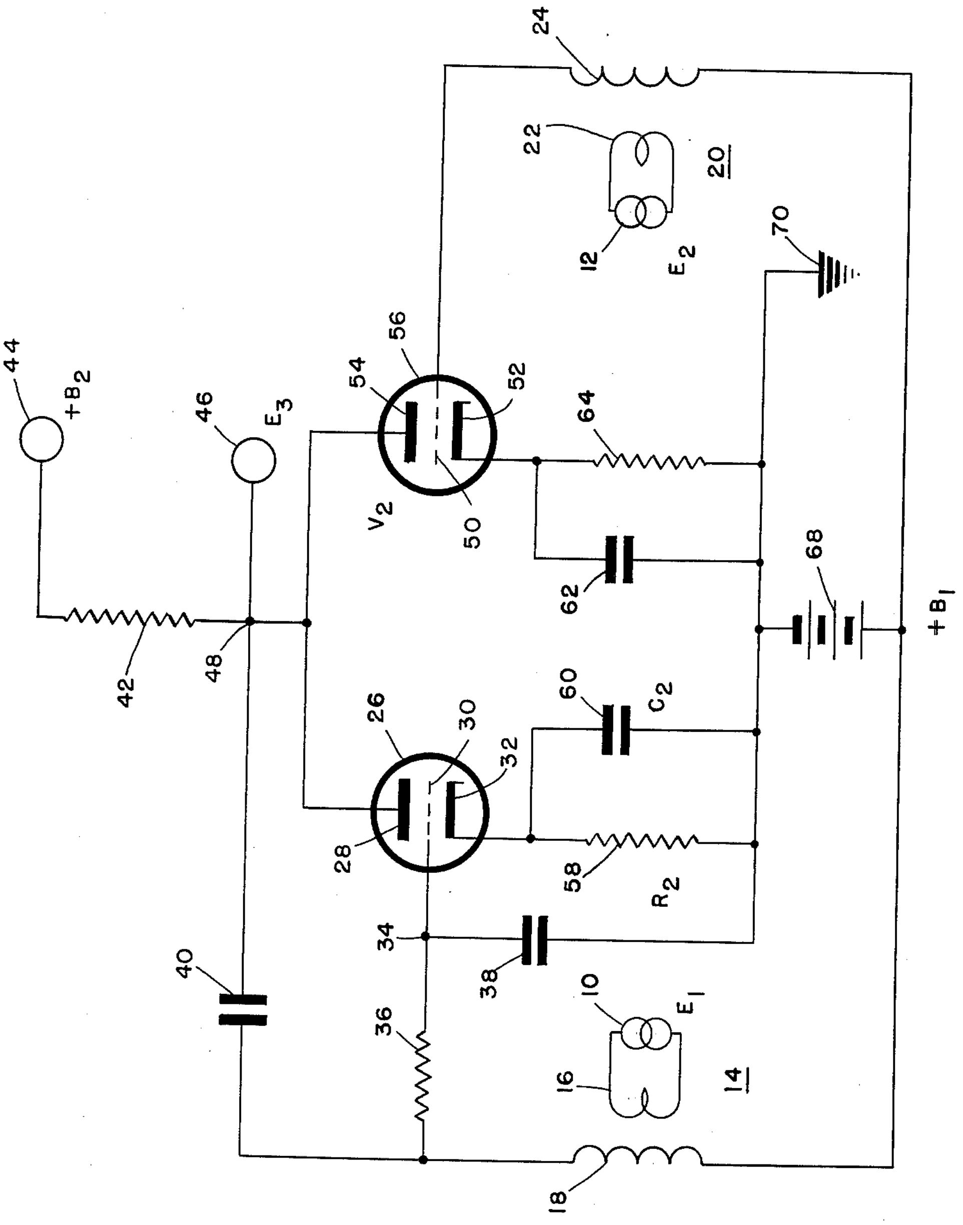
INVENTOR
*Robert C. Hilliard*
BY Q. Baxter Warner
Claude Funkhouser
ATTORNEYS 3,015,068
Patented Dec. 26, 1961

3,015,068

STABLE QUADRATURE CIRCUIT

Robert C. Hilliard, Beverly Farms, Mass., assignor, by mesne assignments, to the United States of America as represented by the Secretary of the Navy Filed Aug. 19, 1959, Ser. No. 834,904
13 Claims. (Cl. 328—158)

This invention relates to a stable quadrature phase shifter and to means for adding two similar voltages in quadrature.

It is frequently desirable in computing type circuitry to combine two A.-C. voltages in a ninety degree phase relation to one another. The sum thereby produced is a quadrature sum equal to the hypotenuse of a right triangle containing the two input voltages as sides. Before adding it is first usually necessary to shift the phase of one or both of the input A.-C. signals to obtain a ninety degree phase relationship therebetween.

Phase shifting can be accomplished by means of mechanical rotary transformer and capacitor devices, with passive phase shift networks, or with electron tube phase shifting circuits operating upon one or both of the input signals. The mechanical type of phase shifter is rather cumbersome and critical of adjustment. Likewise, a phase shift network or ladder network composed entirely of passive resistive and reactive components is critical of operating frequency and component values, making a consistent ninety degree phase shift difficult to obtain. Fairly uniform angular displacement may be acquired with many phase shifters employing a plurality of electron tubes, however, results are somewhat dependent upon the operating voltages and characteristics of the electron tubes and components employed. Many of these circuits, if uncomplicated, are also frequency critical.

It is accordingly an object of this invention to provide a quadrature phase shifting apparatus of improved stability in a single amplifier stage.

It is another object of this invention to provide an improved quadrature summing circuit for a pair of input signals which is relatively economical in construction and independent of circuit variations.

It is another object of this invention to provide an improved quadrature circuit which is not particularly critical of minor variations in operating frequency or operating voltage.

Other objects and many of the attendant advantages of this invention will be readily appreciated as the same becomes better understood by reference to the following description when considered in connection with the accompanying drawing, which is a schematic diagram showing by way of example a preferred embodiment of the invention.

In accordance with the invention a single electron tube stage having substantially unity gain is excited on its grid with an input signal shifted nearly ninety degrees in phase by an intermediate resistance-reactance phase shift network. The same input signal is also applied to the output of the stage through a second resistance-reactance phase shift network. In this latter instance, however, an opposite type of reactance is employed; or alternatively, the resistance and reactance are interchanged in their position from those used in the first phase shift network. Resistance and reactance values are chosen so that one of the networks produces a voltage leading the input signal by nearly ninety degrees, while the other resistance-reactance network produces a voltage lagging the input signal by nearly ninety degrees. Phase reversal takes place across the amplifier stage; therefore, at the output of the stage, two component voltages will appear: one slightly less than ninety degrees from the input signal and one slightly more than ninety degrees from the input signal. These two components are of substantially equal magnitude and add to produce a resultant which lies ninety degrees from the input signal regardless of minor changes in operating frequency, component values, or operating voltages used with the stage. The amplifier stage is made to have unity gain by providing a large negative feedback, which renders the stage particularly stable and independent of circuit variations.

According to another feature of the invention, a second voltage of the same frequency as the first is added to the output produced by the first stage by means of a second electron tube which may be incorporated in the same envelope as the first. The output electrodes of the two stages feed a common load. The second stage may be provided with a large negative feedback to adjust the outputs of the two stages to commensurate magnitudes for addition in the common load. The resulting quadrature adder is compact, economical, and substantially independent of circuit variations.

Referring now to the drawing, showing a preferred embodiment of the invention, a first input signal voltage $E_1$, depicted as being generated by a generator 10, is applied to the primary 16 of a transformer 14. The ground end of secondary 18 of transformer 14 is connected to a terminal of a battery 68 employed to secure proper D.-C. operating voltages for the amplifier grids. One end of secondary 18 is therefore substantially connected to ground 70 for the A.-C. signal it develops. The remaining end of the secondary 18 is coupled through a resistor 36 to the grid 30 of electron tube 26, and through a capacitor 40 to its anode 28. A terminal 44, for connection to a source of operating plate voltage with respect to ground, is connected through the plate resistor 42 to anode 28 of electron tube 26 and anode 54 of electron tube 56. Terminal 46 is a common output point with respect to ground. An input capacitor 38 returns grid 30 of tube 26 to ground while cathode 32 of the same stage is returned to ground through the parallel combination of resistor 58 and capacitor 60. Capacitor 38 and resistor 36, constituting an input voltage divider from secondary 18 to grid 30, are chosen to have equal impedance at a frequency substantially lower than the frequency of input voltage $E_1$, for example, by a factor of 10. Capacitor 40 and resistor 42 are likewise chosen to have equal impedance at a frequency higher than the frequency of input voltage $E_1$ by substantially the same factor (in this case 10). Capacitor 40 and resistor 42 comprise a second voltage divider for the signal voltage across secondary 18, it being assumed that the plate supply voltage, $+B_2$ applied to terminal 44, is filtered or bypassed to ground so that such terminal is at A.-C. ground. It can be seen from the values of resistance and capacitance selected that the voltage divider composed of resistor 36 and capacitor 38 will have a relatively high resistance and a relatively high capacitance producing therefore a substantially lagging voltage across capacitor 38 approaching ninety degrees with respect to the input voltage. It is apparent that no matter what values of resistance and capacitance are selected, the voltage lag can never quite reach ninety degrees, but may, for example, reach eighty five degrees. It is likewise seen from the values of capacitor 40 and resistor 42 selected, that the voltage at point 48 due to the input signal will lead such input signal by a similar angular difference approaching ninety degrees but never quite reaching it.

Resistor 58 is chosen to have a resistance equal to resistor 42 while capacitor 60 is chosen to have a capacitance equal to capacitor 40. If the conductance of these components is small compared to the transconductance of tube 26, the gain of tube 26 will be essentially unity but with a one hundred eighty degree phase reversal at the anode 28. Resistors 42 and 58 are relatively high and equal in value and comprise a D.-C. voltage divider with tube 26 in the middle. A positive voltage bias source 68 is therefore employed to provide the proper D.-C. voltage level for the grid 30 through secondary 18. The parallel cathode and anode circuits of tube 26 are also equal in A.-C. impedance and therefore the stage will have substantially unity gain.

A second electron tube 56, which may be in the same envelope as electron tube 26, has its grid 50 connected to one end of secondary 24 of transformer 20, the remaining end of which is returned to the positive terminal of bias battery 68, or A.-C. ground. The parallel combination of capacitor 62 and resistor 64 returns cathode 52 of tube 56 to ground. The product of the capacitance and resistance of capacitor 62 and resistor 64 is made equal to the multiplication of the capacitance and resistance of capacitor 40 and resistor 42. An alternating current voltage divider is thereby formed with the grid and cathode circuits of tube 56. Since the product of capacitance and resistance of each parallel combination are equal, it is seen that these parallel combination form impedances having equal phase angles. There will therefore be zero phase shift across electron tube 56 from grid 50 to anode 54, providing the conductances of the afore-mentioned resistor and capacitor combinations are small compared to the transconductance of the tube. The second signal for the quadrature combination, $E_2$, depicted as generated in generator 12, is applied to primary 22 of transformer 20 and thence to the secondary 24 and grid 50.

By operation of the circuit, two in-phase voltages $E_1$ and $E_2$ of substantially equal frequency are combined in quadrature to provide a common output, $E_2$, at terminal 46. The voltage $E_1$ from secondary 18 is shifted ahead in phase by the voltage divider consisting of capacitor 40 and resistor 42, and an equal amount behind in phase by the voltage divider consisting of resistor 36 and capacitor 38. Since there is a one hundred eighty degree phase shift across the tube, the voltage appearing at the anode 28, due to the grid input signal from the mid-point 34 of the second mentioned voltage divider, now leads the input voltage $E_1$ by slightly over ninety degrees. It is combined at point 48 with the voltage through the divider composed of capacitor 40 and resistor 42, which leads the input voltage $E_1$ by an equal angular amount slightly less than ninety degrees, but which is equal to the voltage developed by anode 28 in magnitude. The magnitude equality is because of the unity amplification of the stage and because resistor 36 and capacitor 38 are made equal in impedance at a frequency lower than the operating frequency by a given factor, while capacitor 40 and resistor 42 are made equal at a frequency higher than the operating frequency by the same factor. With these selected values employed for the two voltage dividers, the ratio of voltage division will be the same; that is, if the frequencies at which the impedances are equal differ above and below the frequency of $E_1$ by the same factor of 10, the voltages measured at points 34 and 48 will each be approximately 1/10 of the voltage across secondary 18 in magnitude. Transformer 14 may be arranged to step up input signal $E_1$ accordingly. The combined signal at point 48 due to $E_1$ will be proportional to $E_1$ in magnitude but will always remain ninety degrees away from $E_1$ in spite of minor changes in frequency. It will be seen that a small increase in frequency will cause the voltage at point 48 due to the voltage divider composed of capacitor 40 and resistor 42 to increase slightly in magnitude but such voltage will then be shifted less in phase than it would have been at the original operating frequency. Likewise, the increase in frequency would cause the voltage at point 34 to drop slightly in magnitude but this voltage will not approach quadrature more closely. These factors tend to cancel one another so that the combined output voltage at point 48 due to input voltage $E_1$ remains substantially constant in magnitude.

The second input voltage $E_2$ is introduced by transformer 20 and applied at the grid of tube 56. As hereinbefore set out, this stage has zero phase shift due to the choice of capacitor 62 and resistor 64 values. Since only the product of the capacitor 62 and resistor 64 values is determinative of phase shift considerations, these values may also be chosen to adjust the magnitude of the signal appearing at anode 54 of tube 56 due to the input voltage $E_2$. Thus, the parallel impedance combination of capacitor 62 and resistor 64 may be adjusted relative to the parallel combination of resistor 42 and capacitor 40 to reduce the input voltage $E_2$ in proportion to the amount signal $E_1$ has been reduced. It should be noted, however, that this adjustment can be made by adjusting the turn's ratio of transformer 20. It is also noted, however, that stage 56 is normally maintained at a gain of less than unity by means of substantial negative feedback in its cathode circuit. This substantial negative feedback, like the negative feedback in the cathode circuit of stage 26, greatly improves the stability of the circuit and aids in making circuit operation generally independent of operating voltages, age of the electron tubes employed, etc.

It is apparent that various changes could be made in the apparatus without departing from the invention as claimed. Thus, tubes 26 and 56 could be replaced by transistors or other translating devices having a one hundred eighty degree phase shift thereacross. Furthermore, the passive phase shift networks or voltage dividers which in the illustrated embodiment comprise capacitors and resistors could be replaced in whole or in part by phase shift circuits employing inductors and resistors or other combinations producing phase shifts of nearly ninety degrees. Bias supply 68 shown as a battery may obviously be replaced by other power supply forms, and the transformer input couplings here employed for introducing the input voltages $E_1$ and $E_2$ without producing a relative phase shift therebetween, can be replaced by other input coupling means which do not introduce a material change in the input signals.

Obviously many other modifications and variations of the present invention are possible in the light of the above teachings. It is therefore to be understood that within the scope of the appended claims the invention may be practiced otherwise than as specifically described.

What is claimed is:

1. A circuit for phase shifting an input voltage by ninety degrees comprising, a phase inverting current control device having an anode and a cathode and a control electrode, a first phase shift means receiving said input voltage for shifting said input voltage less than ninety degrees in a first angular direction, a second phase shift means also receiving said input voltage and shifting said input voltage substantially equal amount in an opposite angular direction, means applying the phase shifted voltage produced by said first phase shift means to the control electrode of said current control device, means for applying the phase shifted voltage of said second phase shift means to the anode of said current control device, and an output terminal coupled to the anode of said current control device.

2. A phase shift circuit comprising, an electronic device having an input and an output with phase inversion therebetween, first passive phase shift means for receiving an input signal and shifting the phase thereof in a nearly-quadrature negative sense, second passage phase shift means for receiving the same input signal and shifting the phase thereof in a nearly-quadrature positive sense, means for applying said phase shifted signal from said first phase shift means to the input of said device, means for applying said phase shifted signal from the second phase shift means to the output of said device, and an output terminal coupled to the output of said device.

3. A circuit for shifting the phase of an input signal by ninety degrees comprising, a current translating device having an anode and a cathode and a control electrode, first phase shift means receiving said input signal and shifting the phase thereof less than ninety degrees in a first sense, second phase shift means for receiving said input signal and shifting the phase thereof less than ninety degrees in a second sense, means coupling said phase shifted signal from said first phase shift means to the control electrode of said current translating device, means coupling the phase shifted signal from said second of the phase shift means to said anode, impedance means connected to the cathode of said current translating device having an A.-C. impedance substantially equal to the A.-C. impedance of said second phase shifting device in order to secure substantially unity amplification in said current translating device, and output terminal means coupled to the anode of said current translating device.

4. A quadrature circuit for combining a first and second input signal of similar frequency each taken with respect to alternating current ground comprising, a first current translating device having an anode and a cathode and a control electrode, first phase shift means for receiving said first input signal and shifting the phase thereof in a first sense, second phase shift means for receiving said first input signal and shifting the phase thereof in a second sense, means for applying the phase shifted signal from said first phase shift means to a control electrode of said current translating device, means for applying the phase shifted signal from said second phase shift means to the anode of said first current translating device, first impedance means connected between the cathode of said first current translating device and ground, said impedance means having an A.-C. impedance substantially equal to the A.-C. impedance of said second phase shift means, a second current translating device having an anode and a cathode and a control electrode for receiving said second input signal, means for coupling the anode of said second current translating device to the anode of said first current translating device, a second impedance connected between the cathode of said second current translating device and ground, said second impedance having the same phase angle as the impedance of said second phase shifting means, and an output terminal coupled to the anode of said first current translating device.

5. A quadrature circuit for combining first and second similar input signals comprising, a first electron device having an input and an output and a voltage phase reversal thereacross, means for receiving said first input signal and shifting the phase thereof in a first direction for application to the input of said electron device, a second phase shift means receiving said first input signal and shifting the phase thereof in the opposite direction for application to the output of said electron device, a second electron device having an input and having an output connected to the output of said first electron device, a resistance-capacitance combination in the cathode circuit of said second electron device having an impedance of substantially equal phase angle to the phase angle of the impedance of said second phase shifting means so that a zero phase shift voltage divider is formed with said second electron device and said second phase shift means, and means coupling said second input signal to the input of said second electron device.

6. A circuit for shifting a phase of an input signal by ninety degrees comprising, an electron tube having an anode, a cathode and a grid, a first resistance-reactance voltage divider for achieving a large positive phase shift wherein said resistance and reactance are chosen to have equal impedance at a frequency considerably higher than the frequency of said input signal, a second resistance-reactance voltage divider for achieving a large negative phase shift wherein said resistance and reactance are chosen to have equal impedance at a frequency considerably lower than the frequency of said input signal, each of said voltage dividers being energized across said input signal, one of said voltage dividers providing a tapped output voltage for the grid of said tube and the other of said voltage dividers providing an output voltage coupled to the anode of said tube, and a cathode circuit for said tube having an impedance equal at the frequency of said input signal to the impedance at the same frequency of the parallel combined resistance and reactance of the said voltage divider coupled to the anode of said tube.

7. In combination with the apparatus of claim 6, a second electron tube having an anode and a cathode and a grid supplied with a second input signal of similar frequency and magnitude to the first, means coupling the anode of said second tube with the anode of said first tube, and a cathode circuit for said second tube whose impedance at the frequency of said signals has the same phase angle as the phase angle of the parallel combined resistance and reactance of the voltage divider coupled to the anode of said first tube.

8. A circuit for shifting the phase of an input voltage taken with respect to a A.-C. ground comprising, an electron tube device having an anode, a cathode and a grid, a point of supply potential, a first voltage divider coupled across said input voltage with respect to ground including a resistor and capacitor serially arranged in that order, means for coupling the center point of said first voltage divider to the grid of said tube, said resistor and capacitor having equal impedance at a frequency lower than the operating frequency by a given factor, a second voltage divider coupled to said input voltage including a second capacitor and second resistor serially arranged in that order to the point of supply potential, and means coupling the center point of said second voltage divider to the anode of said tube.

9. The apparatus of claim 8 additionally including a parallel resistance and capacitance circuit coupled between the cathode of said tube and ground, said latter resistance and capacitance being equal respectively to the resistance and capacitance of the said second voltage divider.

10. A quadrature circuit for combining two input signals comprising, a point of supply potential, an A.-C. ground reference point, a first electron tube having an anode, a cathode and a grid, an input terminal for receiving a first input signal, a resistance-capacitance voltage divider between said terminal and said ground point, said voltage divider being arranged to produce a large negative phase shift in said first input signal at the mid-point thereof, a second resistance-capacitance voltage divider between said terminal and said point of supply potential, said second voltage divider being arranged to produce an equally large positive phase shift in said input signal at the mid-point thereof, means to connect the mid-point of said first voltage divider to said grid, means to connect the mid-point of said second voltage divider to said anode, a resistance-capacitance combination in the cathode circuit of said first tube having values respectively equal to the resistance and capacitance of said second voltage divider, a second electron tube having an anode, a cathode and a grid, means for coupling the anode of said second tube to the anode of said first tube, means for applying a second input signal to the grid of said second tube, and a resistance-capacitance combination in a cathode circuit of said second tube having values chosen such that the product of their resistance and capacitance is equal to the product of resistance and capacitance of the second voltage divider, the resistance in the cathode of said second tube being chosen to adjust the magnitude of said second input signal as seen on the anode of said second tube to a magnitude substantially equal to the combined signal amplitude at the anode of said first tube.

11. A quadrature circuit for combining two input voltages of equal frequency comprising, means for receiving a first input voltage, means for receiving a second input voltage, positive and negative nearly-quadrature phase shift means connected to said means for receiving said first input voltage, translating means having a pair of principal electrodes and a control electrode, one of said principal electrodes constituting an output electrode, one of said phase shift means being connected to said control electrode and the other being connected to the output electrode, a balancing means connected to the remaining principal electrode of said translating means being equal in impedance magnitude and phase to the impedance of said second phase shift device, a zero phase shift and attenuating means coupling said second input voltage to the output electrode of said translating means, said zero phase shift and attenuating means forming a voltage divider with said second phase shift means, said zero phase shift and attenuating means having an inherent impedance substantially equal in phase angle to the impedance of said second phase shift means.

12. A quadrature circuit for combining two voltages of equal frequency taken with respect to ground comprising, a first terminal to receive a first input voltage, a phase inversion amplifier device of substantially unity gain, a point of operating potential, a resistance between said terminal and the input of said amplifier device, a capacitance coupled between said input and ground for alternating current, a second capacitor connected from said first terminal to the output of said amplifier device, a second resistance coupled between the output terminal of said amplifying device and the source of operating potential, and a zero phase shift and amplitude adjusting device receiving said second input signal and applying it to the output of said first amplifying device with a magnitude equal to the first signal present there.

13. The apparatus of claim 12 wherein said zero phase shift and magnitude adjusting device comprises an electron tube having its anode coupled to the output of said amplifier and having a circuit between its cathode and alternating current ground comprising a parallel combination of a capacitor and resistor the product of whose capacitance and resistance is equal to the product of said second capacitance and said second resistance.

References Cited in the file of this patent

UNITED STATES PATENTS

| | | |
|---|---|---|
| 2,523,115 | Hersh et al. | Sept. 19, 1950 |
| 2,711,508 | Stirrat | June 21, 1955 |
| 2,907,879 | Hall | Oct. 6, 1959 |
| 2,940,048 | Kenny | June 7, 1960 |

FOREIGN PATENTS

| | | |
|---|---|---|
| 881,531 | Germany | July 2, 1953 |